(12) United States Patent
Unthank et al.

(10) Patent No.: US 11,203,661 B2
(45) Date of Patent: Dec. 21, 2021

(54) PROCESS FOR THE MANUFACTURE OF AN EPOXY-FUNCTIONAL POLYESTER, EPOXY-FUNCTIONAL POLYESTER OBTAINED BY SUCH PROCESS AND COATING COMPOSITION COMPRISING SUCH EPOXY-FUNCTIONAL POLYESTER

(71) Applicant: Akzo Nobel Coatings International B.V., Arnhem (NL)

(72) Inventors: Matthew George Unthank, Whitley Bay (GB); Ian Marchant Jackson, Newcastle upon Tyne (GB); Barry Gordon Thompson, Thornley (GB)

(73) Assignee: Akzo Nobel Coatings International B.V.

( * ) Notice: Subject to any disclaimer, the term of this patent is extended or adjusted under 35 U.S.C. 154(b) by 0 days.

(21) Appl. No.: 16/312,016

(22) PCT Filed: Jul. 10, 2017

(86) PCT No.: PCT/EP2017/067191
§ 371 (c)(1),
(2) Date: Dec. 20, 2018

(87) PCT Pub. No.: WO2018/011103
PCT Pub. Date: Jan. 18, 2018

(65) Prior Publication Data
US 2019/0375884 A1    Dec. 12, 2019

(30) Foreign Application Priority Data
Jul. 13, 2016 (EP) .................................. 16179149

(51) Int. Cl.
| | | |
|---|---|---|
| *C08G 59/12* | (2006.01) | |
| *C08G 63/90* | (2006.01) | |
| *C08G 63/91* | (2006.01) | |
| *C08K 3/20* | (2006.01) | |
| *C08K 3/24* | (2006.01) | |
| *C08K 5/19* | (2006.01) | |
| *C08K 5/49* | (2006.01) | |
| *C09D 5/03* | (2006.01) | |
| *C09D 167/00* | (2006.01) | |

(52) U.S. Cl.
CPC ............ *C08G 59/12* (2013.01); *C08G 63/90* (2013.01); *C08G 63/914* (2013.01); *C08K 3/20* (2013.01); *C08K 3/24* (2013.01); *C08K 5/19* (2013.01); *C08K 5/49* (2013.01); *C09D 5/03* (2013.01); *C09D 167/00* (2013.01); *C08G 2150/20* (2013.01)

(58) Field of Classification Search
CPC ...... C08G 63/90; C08G 63/914; C08G 59/12; C08G 2150/20; C08K 3/20; C08K 3/24; C08K 5/19; C08K 5/49; C09D 5/03; C09D 167/00
USPC ........................................................ 525/438
See application file for complete search history.

(56) References Cited

U.S. PATENT DOCUMENTS 5,739,213 A    4/1998    Freriks et al.

FOREIGN PATENT DOCUMENTS

| | | | | |
|---|---|---|---|---|
| CN | 105440262 A | * | 3/2016 | ............ C08G 59/12 |
| GB | 766771 A | | 1/1957 | |
| JP | 55-060575 A | | 5/1980 | |
| JP | 56-008374 A | | 1/1981 | |
| JP | 59-189121 A | | 10/1984 | |
| KR | 10-2007-0012447 A | | 1/2007 | |
| WO | 1994/04589 A1 | | 3/1994 | |
| WO | 1995/25762 A1 | | 9/1995 | |
| WO | 1999/51659 A1 | | 10/1999 | |
| WO | 2000/27901 A1 | | 5/2000 | |
| WO | 2000/27937 A1 | | 5/2000 | |
| WO | 2001/30881 A1 | | 5/2001 | |
| WO | 2005/097867 A | | 10/2005 | |

OTHER PUBLICATIONS

Wan et al., CN 105440262 A machine translation in English, Mar. 30, 2016 (Year: 2016).*
Principles of polymerisation, Wileys and Sons, Fourth Edition, George Odian, Section 2.8 Process Conditions, 2004, 15 pages, ISBN 0-471-27400-3.
Zhang et al., "Synthesis of novel low-viscosity liquid epoxidized aromatic hyperbranched polymers", European Polymer Journal, 2006, vol. 42, 711-714.
Bukowska et al., "Synthesis of glycidyl esters", J. Chem. Technol. Biotechnol., 1999, vol. 74, 1145-1148.

* cited by examiner

*Primary Examiner* — David T Karst
(74) *Attorney, Agent, or Firm* — McDonnell Boehnen Hulbert & Berghoff LLP

(57) ABSTRACT

The present invention relates to a process for the manufacture of an epoxy-functional polyester, and to solid epoxy-functional polyesters made by such process and to a coating composition, in particular a powder coating composition, comprising such solid epoxy-functional polyester. The polyester made as disclosed herein is particularly useful in powder coatings.

14 Claims, No Drawings

PROCESS FOR THE MANUFACTURE OF AN EPOXY-FUNCTIONAL POLYESTER, EPOXY-FUNCTIONAL POLYESTER OBTAINED BY SUCH PROCESS AND COATING COMPOSITION COMPRISING SUCH EPOXY-FUNCTIONAL POLYESTER

This application is the US national phase under 35 U.S.C. § 371 of international application PCT/EP2017/067191, filed Jul. 10, 2017, which claims priority to European application 16179149.6, filed Jul. 13, 2016.

FIELD OF THE INVENTION

The present invention relates to a process for the manufacture of an epoxy-functional polyester, to an epoxy-functional polyester obtainable by such process and to a coating composition comprising such epoxy-functional polyester. The process can be used to manufacture resins with a Tg of above 35° C., which are in particular useful for use in powder coatings.

BACKGROUND OF THE INVENTION

The manufacture of epoxy-functional polyesters is known in the art. In WO2001/30881 a two-step process is described for the manufacture of an epoxy-functional polyester. In a first step a carboxylic acid is reacted with a halo-substituted mono-epoxide in the presence of a base to give an epoxy-functional polyester with high hydrolysable chloride content which is isolated. The second step is a dehydrohalogenation step in the presence of a base. The base used is an alkali metal or alkaline earth metal carbonate and/or hydrogen carbonate. The dehydrohalogenation step is carried out in the presence of an aprotic dipolar organic solvent. In the first stage of the process water is also intentionally added to the reaction mixture, which will lead to hydrolysis of polyester resulting in a reduction of the molecular weight of the polyester under the temperature range and basic conditions stated, as would be apparent to those versed in the art of polymer chemistry. This process also includes the use of a quaternary ammonium compound. With this process, under specific conditions, a hydrolysable chloride content of below 500 ppm (mg/kg) can be obtained.

In WO1995/25762 a process is described for the manufacture of an epoxy-functional polyester. In a first step a carboxylic acid is reacted with an epihalohydrin in the presence of a catalyst. The second step is a dehydrohalogeneation step. The catalyst can be a tertiary amine, a tertiary phosphine or a quaternary ammonium halide. The dehydrohalogenation step is carried out in the presence of an alkaline reagent, such as sodium hydroxide, potassium hydroxide, calcium hydroxide, sodium carbonate or potassium carbonate. The products described in WO1995/25762 have low glass transitions temperatures (often below 0° C.), so are non-typical for use in powder coatings as would be apparent to those skilled in the art of polymer chemistry or knowledgeable in the field of powder coatings.

In WO1999/51659 a two-step process is described for the manufacture of an epoxy-functional polyester. In a first step a carboxylic acid is reacted with an epihalohydrin. In the second step the obtained mixture is reacted with an aqueous NaOH solution at elevated temperatures. In this process water is present, which will lead to hydrolysis of polyester resulting in a reduction of the molecular weight of the polyester, as would be apparent to those skilled in the art of polymer chemistry. A similar process is disclosed in WO2000/27901 and in WO2000/27937.

In WO1994/04589 a further process is described for the manufacture of a glycidyl ester terminated polyester. In this process a polyester resin having terminal carboxyl groups is dissolved in an excess of epihaloalkane. This mixture is reacted at elevated temperature in the presence of a catalyst. The catalyst is removed from the mixture by washing and the excess epihaloalkane is removed by evaporation under reduced pressure. The catalyst can be for example benzyltrimethylammonium bromide. It was found that in this process hydrochloric acid is formed, which must be collected from the reaction mixture. Further, it was found that the catalyst must be completely removed from the glycidyl ester terminated polyester resin to be suitable for use in powder coating application. Further, a relatively low conversion rate of the acid functional groups to epoxy functional groups was found for this process.

Therefore, there is a need for a process for the manufacture of an epoxy-functional polyester wherein very limited or no hydrolysis of the polyester polymer backbone occurs and whether the rate of conversion of carboxyl-functional groups into epoxy-functional groups is high. There is also a need for a process for the manufacture of an epoxy-functional polyester, during which the glass transition temperature (Tg) is not significantly lowered in comparison to the parent polyester, and preferably not lowered at all.

SUMMARY OF THE INVENTION

Surprisingly it has been found that an epoxy-functional polyester can be manufactured using a process that fulfills the above criteria.

According to a first aspect, the invention provides a process for the manufacture of an epoxy-functional polyester, comprising the steps of:
a) providing a polyester having functional groups selected from hydroxyl groups and carboxylic groups;
b) reacting the functional groups of the polyester with an epihaloalkane to obtain an epoxy-functional polyester dissolved in a liquid phase;
c) optionally adding an organic solvent to the liquid phase obtained in step b);
d) precipitating the epoxy-functional polyester from the liquid phase obtained in step b) or in step c); and
e) isolating the precipitated epoxy-functional polyester from the liquid phase by a solid-liquid separation technique to obtain a solid epoxy-functional polyester.

The process according to the present invention enables the manufacture of an epoxy-functional polyester at a high conversion level in combination with a limited or no decrease in molecular weight (expressed as $M_n$) and where the glass transition temperature of the epoxidised polyester is comparable to that of the starting polyester.

The epoxy-functional polyester obtained in the process according to the invention can be used in various applications, for example as a resin in coatings. During the process according to the invention, the Tg of the polyester is not significantly affected, preferably not affected at all. A significantly lower Tg of the obtained epoxy-functional polyester, compared to the starting polyester, limits the application possibilities of the polyester in powder coatings. The epoxy-functional polyester obtained preferably has a Tg>35° C. and surprisingly this is routinely achieved in the manufacturing process of the invention In a second aspect, the present invention provides a process for the preparation of a coating composition, preferably a powder coating composition, comprising a process for the manufacture of an epoxy-functional polyester according to the first aspect of the invention and further comprising mixing the solid epoxy-functional polyester obtained with other components to form a coating composition. Such other components typically comprise a cross-linker and, optionally, a catalyst, fillers, pigments and/or additives.

In a third aspect, the invention provides a solid epoxy-functional polyester obtainable by a process according to the first aspect of the invention. In a final aspect, the invention provides a coating composition, preferably a powder coating composition, comprising a solid epoxy-functional polyester according to the third aspect of the invention.

DETAILED DESCRIPTION OF THE INVENTION

In the process according to the present invention, a polyester having functional groups selected from hydroxyl groups and carboxylic acid groups is provided. This polyester can be linear or branched. The polyester can be obtained by reacting hydroxyl functional components and acid functional components in any process that is known in the art.

The hydroxyl functional components can for example be selected from aliphatic, cycloaliphatic or aromatic hydroxylated compounds, such as ethylene glycol, propylene glycol, neopentylglycol, 1,4-butanediol, 1,6-hexanediol, 2-methyl-1,3-propanediol, 2-butyl-2-ethyl-1,3-propanediol, 1,4-cyclohexanedimethanol, 1,4-cyclohexanediol, hydrogenated bisphenol A, neopentylglycol hydroxypivalate, trimethylolpropane, di-trimethylolpropane, pentaerythritol and mixtures thereof. When a compound with more than two hydroxyl functional groups is used in the preparation of the polyester resin, a branched polyester resin may be obtained.

The acid functional components can for example be selected from aromatic, aliphatic or cycloaliphatic carboxylic acids. Examples of suitable carboxylic acids include isophthalic acid, terephthalic acid, phthalic acid, succinic acid, glutaric acid, adipic acid, pimelic acid, suberic acid, azelaic acid, sebacic acid, fumaric acid, maleic acid, 1,3-cyclohexanedicarboxylic acid, 1,4-cyclohexanedicarboxylic acid, 1,10-decanedioic acid, 1,11-undecanedioic acid, 1,12-dodecanedioic acid, 1,13-tridecanedioic acid, 1,14-tetradecanedioic acid, 1,15-pentadecanedioic acid, 1,16-hexadecanedioic acid, trimellitic acid or anhydride, and pyromellitic acid or anhydride. When a compound with more than two acid functional groups is used in the preparation of the polyester resin, a branched polyester resin may be obtained. Instead of the acids, derivatives of the above acids can be used to synthesize polyesters, as described in 'Principles of polymerisation', Wileys and Sons, Fourth Edition, George Odian, Section 2.8 (ISBN 0-471-27400-3). Such derivatives for example include acid ester and acid chloride derivatives. An acid functional polyester is obtained when a molar excess of acid functional groups is used in the preparation of the polyester in comparison to hydroxyl functional groups, or when a hydroxyl terminated polyester is post-functionalized to give terminal acid functionality, for example with an anhydride.

The polyester provided may be a single polyester or a mixture of two or more polyesters.

The polyester may be provided as a solid or in the form of a solution in a solvent.

In step b) of the process according to the invention, the functional groups of the polyester are reacted with an epihaloalkane to obtain an epoxy-functional polyester dissolved in a liquid phase. Suitable epihaloalkanes include 1-chloro-2,3-epoxypropane (epichlorohydrin), 1-chloro-2-methyl-2,3-epoxy propane, 1-chloro-2,3-epoxybutane, and 1-bromo-2,3-epoxy propane. The use of 1-chloro-2,3-epoxy propane is preferred.

In order to achieve a high conversion of the functional groups of the polyester into epoxy-functional groups, an excess of epihaloalkane is preferably used. In some embodiments, 10 to 40 equivalents of epihaloalkane may be added per functional (hydroxyl and/or carboxylic acid) group present in the polyester, more preferably 20 to 30 equivalents of epihaloalkane per functional group.

Reaction step b) is carried out in a liquid phase. The liquid phase may be provided by the epihaloalkane. In addition to the epihaloalkane, an organic solvent wherein both the starting polyester and the obtained epoxy-functional polyester dissolve under the reaction conditions applied, may be present during step b). Such solvent may be added with the polyester (in case the polyester is provided as a solution) or may be separately added to the polyester and the epihaloalkane before or during reaction step b).

The solvent wherein the polyester is dissolved or that is separately added before or during reaction step b) preferably is a solvent that does not hydrolyse or degrade the polyester or reduce the molecular weight of the polyester under the reaction conditions applied in step b). Therefore, the solvent preferably is an aprotic solvent, which can be polar or non-polar in nature.

Aprotic solvents are solvents which cannot function as a proton donor. Nonpolar solvents contain bonds between atoms with similar electronegativity. Normally these nonpolar solvents have a low dielectric constant (<5). Polar solvents are solvents in whose molecules there is either a permanent separation of positive and negative charges, or the centers of positive and negative charges do not coincide and thus contain a dipole; these solvents typically have high dielectric constants (>5).

Examples of suitable solvents include esters, ketones, ethers, sulfoxides, amides, hydrocarbons, halohydrocarbons and carbonates. Particularly, propyleneglycol monomethyl ether acetate, xylene, toluene, benzene, ethyl acetate, n-butyl acetate, n-propylacetate, iso-propyl acetate, isoamyl acetate, tetrahydrafuran, 2-methyltetrahydrofuran, diethylether, tert-butylmethylether, anisole, acetone, methylethylketone, methyl isopropyl ketone, methyl-n-butylketone, methyl-isobutylketone, methylisoamylketone, cyclohexanone, dimethylformamide, N-ethylacetamide, N-methylacetamide, dimethylsulfoxide, dichloromethane, chloroform, 1,2-dichloroethane, dimethylcarbonate, or diethylcarbonate or mixtures of two or more of these solvents can be used.

Reaction step b) is preferably conducted in the presence of a base. The base will bind hydrogen halide formed during the reaction. The base used in step b) preferably is a base that does not hydrolyze or degrade the polyester under the reaction conditions applied in step b). Different types of base can be used, e.g. organic or inorganic bases. Preferably, inorganic salts, metal hydroxides or alkoxides are used. Of the salts, carbonates and hydrogen carbonates are preferably used. When metal hydroxide is used, it is preferred that water is actively removed from the reaction mixture. Carbonates and hydrogen carbonates of alkali or alkaline earth metals are preferred, such as potassium carbonate, potassium hydrogen carbonate, sodium carbonate, sodium hydrogen carbonate. Also alkali metal or alkaline earth metal hydroxides and/or alkoxides can be used.

As an alternative to using a base, hydrogen halide may be removed from the reaction mixture by other means, e.g. by distillation or evaporation under reduced pressure.

In some embodiments it is preferred that step b) is conducted in the presence of an ammonium- or phosphonium-salt catalyst. The catalyst may be used with or without the base as described above.

Reaction step b) may take place at ambient temperature or, alternatively, at elevated temperature in order to accelerate the reaction rate. Preferably, elevated temperature is used, such as, for example, a temperature in the range of 70° C. to 200° C., preferably from 70° C. to 150° C. Preferably, the reaction is carried out under reflux conditions for several hours, for example 2 to 9 hours, depending on the process conditions selected. The reaction can be conducted until it has progressed to completion or to an acceptable level of conversion.

In reaction step b), epoxy-functional polyester dissolved in a liquid phase may be obtained. The liquid phase in which the epoxy-functional polyester is dissolved may be excess epihaloalkane or may be an organic solvent that was present during reaction step b) optionally in combination with excess epihaloalkane.

In precipitation step d), the epoxy-functional polyester is precipitated from the liquid phase. The liquid phase from which the epoxy-functional polyester is precipitated may be the liquid phase obtained in reaction step b), i.e. the liquid reaction mixture obtained in step b), or may be a liquid phase obtained in an optional step c) wherein a solvent is added to the liquid phase obtained in step b). In case the liquid phase obtained in step b) is such that it is difficult to crystallize the epoxy-functional polyester, it is preferred to add an organic solvent to the liquid phase obtained in step b). The additional solvent preferably is a solvent from which the epoxy-functional polyester can be precipitated by cooling to a temperature not lower than −10° C., more preferably not lower than −5° C.

If an excess of epihaloalkane is used in step b), at least a part of the excess epihaloalkane is preferably removed from the reaction mixture before precipitation step d). The excess of epihaloalkane can be removed, for example, by distillation or evaporation under reduced pressure. Reduced pressure for example means 5 mm Hg, and may range, for instance, of from 0.01 mm Hg to 700 mm Hg. The actual reduced pressure employed can be readily selected by a person skilled in the art given the objectives set forth herein. The epihaloalkane can be collected and recycled for use in a subsequent process.

In some embodiments of the invention it is preferred to use an organic solvent in step b) with a boiling point higher than that of epihaloalkane so that any excess of epihaloalkane can be distilled off without the solvent being distilled as well. Suitable examples of such solvents are propyleneglycol monomethyl ether acetate and xylene. However, solvents with lower boiling points can also be used. In case solvent is removed together with excess epihaloalkane, fresh solvent may be added before precipitation step d), i.e. in optional step c). In case epihaloalkane is used in reaction step b) in the absence of solvent, the epihaloalkane may be removed and replaced with solvent in step c).

When a base is used during step b), a halide by-product is formed during the reaction. Such halide by-product is preferably removed from the reaction mixture before precipitation step d). The removal can be done, for example, by treating the mixture with water to solubilize the halide by-product, and optionally, adjusting the pH. When both the halide by-product and excess epihaloalkane are to be removed, it is preferred to first remove the excess epihaloalkane followed by removal of the halide by-product.

Optionally, the liquid phase obtained in reaction step b) or in optional step c) can be subjected to a purification step before precipitation step d). Purification can for example be done by filtration, preferably with a filter aid. As a filter aid, solid material with a high surface area, such as diatomaceous earth (celite) or kieselguhrcelite, can be used. The filter aid is added to the mixture, the obtained slurry is filtered and the obtained liquid is used in precipitation step d). Preferably, purification prior to precipitation step d) is performed at elevated temperature, such as at a temperature in the range of from 75° C. to 200° C. The described additional purification step is preferably done after removal of excess of epihaloalkane, if such excess removal step is present.

Precipitation can be effected by any known means in the art, e.g. by cooling the mixture, by concentrating the solution, by using an anti-solvent or non-solvent to reduce the solubility of the desired epoxy-functional polyester in the liquid phase, or by a combination of two or more thereof. Preferably, the epoxy-functional polyester is precipitated by cooling, for example, to ambient temperature, i.e. a temperature in the range of from 15° C. to 30° C., or to a temperature below ambient temperature, i.e. below 30° C. Preferably, the epoxy-functional polyester is precipitated by cooling to a temperature in the range of from −5° C. to 25° C. As an example, in some embodiments it is preferred to cool the mixture to 0° C. When precipitation of the epoxy-functional polyester also leads to precipitation of the halide side product, the latter can be conveniently washed away by water or other suitable solvent.

In a preferred embodiment, reaction step b) is carried out in a liquid phase comprising an organic solvent in which the epoxy-functional polyester formed dissolves at the reaction temperature, but precipitates when cooled to ambient temperature. In another preferred embodiment, such organic solvent is added to the liquid phase in optional step c).

In step e), the precipitated epoxy-functional polyester is isolated from the liquid phase by a solid-liquid separation technique. Any known solid-liquid separation technique can be used, such as filtration, centrifuge separation, decantation. Preferably, filtration is used. This step can suitably take place at a temperature below ambient temperature, i.e. below 30° C. The isolated solid can be further washed with water or any solvent to remove any undesired side products or inorganic material, such as halides.

The various process steps elucidated above can be carried out in any suitable apparatus known to the skilled person.

In the process according to the present invention a conversion level can be obtained of at least 70%, more in particular of at least 80%. The conversion level relates to the amount of carboxylic acid and hydroxyl functional groups that is converted to epoxy-functional groups and is defined as follows:

Conversion level=$EFC/(EFC+AHFC)*100\%$ wherein
EFC=total amount of epoxy functional groups present in the epoxy-functional polyester resin collected after the reaction,
AHFC=total amount of carboxylic acid and hydroxyl functional groups remaining in the polyester resin after the epoxidation process.

The decrease of molecular weight is in general lower than 20%, more in particular lower than 10%. Surprisingly, in some cases the change in molecular weight is actually an increase in the range of from 0 to 50%, mainly as a result of changes in the molecular weight distribution in the low molecular weight range. The change in molecular weight can be expressed as follows, where $|\Delta M_n|$ represents the change in molecular weight regardless of whether the value is positive or negative (modulus):

$$|\Delta M_n|=(|M_{nAHFP}-M_{nEFP}|)/M_{nAHFP}*100\%$$

wherein $M_{nAHFP}$=Molecular weight (Mn) of the carboxylic acid and/or hydroxyl-functional polyester (present at the start of the reaction)

$M_{nEFP}$=Molecular weight (Mn) of the epoxy-functional polyester (collected after the reaction)

The epoxy-functional polyester obtained in the process of the present invention has a Tg>35° C. and is therefore particularly suitable for use in powder coatings. It can be used in liquid coating compositions as well. Such coating composition is typically obtained by mixing the epoxy-functional polyester obtained with other components that are commonly used in coating compositions. Such other components at least include a cross-linker suitable for crosslinking an epoxy-functional polyester. Optionally, the other components include a catalyst, pigments, fillers, and/or additives.

As a crosslinker, a material having carboxylic acid or anhydride functionality can be used. Examples of suitable materials include carboxylic acid functional polyesters of the type used in the epoxidation process, or other carboxylic acid functional polyesters. Other acid carboxylic acid functional polymers include polyacrylates, polyurethanes, polycarbonates and polyamides. Other acid functional materials suitable as crosslinker include succinic acid, adipic acid, octanedioic acid, sebacic acid, dodecanedioic acid, phthalic acid, isophthalic acid, terephthalic acid, trimellitic acid, trimesic acid, tartaric acid, citric acid, ethylenediaminetetraacetic acid, dimer fatty acids. Anhydride functional materials suitable as crosslinker include anhydrides such as phthalic anhydride, trimellitic anhydride, maleic anhydride, malonic anhydride, succinic anhydride, and polyanhydrides such as those derived from homo-polymers or co-polymers of maleic anhydride.

Alternatively, the epoxy-functional polyester obtained according to the present invention can be crosslinked with dicyanodiamide, polyamines, polyalcohols, polythiols or through epoxy-epoxy homopolymerization via etherification.

Any catalyst known in the art for the catalysis or initiation of the epoxy-acid, epoxy-amine, epoxy-alcohol, epoxythiol, epoxy-epoxy or epoxy-anhydride curing reaction can be used as catalyst in the coating composition.

Suitable additives for coating compositions, in particular for powder coating compositions, include: flow control agents; degassing agents; antiblocking agents; adhesion promoters; light stabilizers and UV absorbers; flow and levelling additives; gloss-modifying additives; anti-cratering agents; co-cure agents; texturizers; surfactants; wetting agents; antioxidants (in particular phosphites, hindered phenols and propionates); biocides; and, organic plasticizers.

Examples of pigments that can be used are inorganic pigments, such as titanium dioxide, red and yellow iron oxides, chrome pigments and carbon black, and organic pigments, such as for example phthalocyanine, azo, anthraquinone, thioindigo, isodibenzanthrone, triphendioxane, and quinacridone pigments, vat dye pigments and lakes of acid, basic and mordant dyestuffs. Dyes can be used instead of pigments.

Fillers may be employed to reduce cost and/or reinforce or modify the performance and appearance of the coatings. In powder coating compositions, fillers comprising glass particles, glass fibres, metal fibres, metal flakes and particles of micas or calcium metasilicate can suitably be used. Inorganic sulphates such as barytes, carbonates such as chalk, and silicates such as talc are commonly used.

Metallics including zinc rich anticorrosive particulates may be added to powder coating compositions to impart corrosion resistance to the underlying substrate.

In powder coating compositions, flow control agents may be present in an amount up to 3 wt. % based on the weight of the composition. Such flow control agents, which enhance the compositions melt-flow properties and assist in eliminating surface defects, typically include acrylics and fluorine based polymers. Examples of commercially available flow control agents include: Resiflow® P-67, Resiflow® P-200 and Clearflow® (all available from Estron Chemical Inc., Calvert City, Ky.); BYK® 361 and BYK® 300 from BYK Chemie (Wallingford, Conn.); Mondaflow® 2000 from Monsanto (St. Louis, Mo.); and, Acronal 4F from BASF.

Degassing agents can also be used in the powder coating compositions of the present invention in an amount between 0.1 and 5 wt. %, based on the weight of the composition. Such degassing agents facilitate the release of gases during the curing process. Examples of commercially available degassing agents include: Benzoin available from Well Worth Medicines; and, Uraflow® B available from GCA Chemical Corporation (Brandenton, Fla.).

In a conventional process for the manufacture of a powder coating composition, all ingredients of the powder coating composition are pre-mixed and thereafter melt-mixed in an extruder. The molten mixture is then cooled and kibbled or granulated and grinded into a powder coating.

EXAMPLES

The invention will be elucidated with reference to the following examples. These are intended to illustrate the invention but are not to be construed as limiting in any manner the scope thereof.

Measurement Methods

Glass Transition Temperature

Any reference herein to Tg (glass transition temperature) is to the Tg as measured by Differential Scanning calorimetry (DSC). Differential Scanning calorimetry (DSC) is a thermal analysis technique that looks at how a material's heat capacity (Cp) varies with temperature. A sample of known mass is heated or cooled in a small pan alongside an identical but empty pan and the changes in its heat capacity are tracked as changes in the heat flow. This allows the detection of transitions such as melts, glass transitions, phase changes, and curing. The biggest advantage of DSC is the ease and speed with which it can be used to see transitions in materials. In the glass transition region, where the material changes from a glassy form to a liquid form, there is an endothermic step-change in the heat flow the midpoint (or onset or inflection point) of which can be used to define the glass transition (Tg). For the purpose of this patent all Tg values mentioned are midpoint values, as is standard and a well-known method to those knowledgeable in the art of polymer science.

DSC machine and run details: Perkin Elmer Jade DSC with intercooler and nitrogen supply. Run sequence; Cool to −50° C. at 50° C./minute; hold for 5 minutes at −50° C.; Heat from −50° C. to 250° C. at 20° C./minute; Cool from 250° C. to −50° C. at 50° C./minute; Hold for 5 minutes at −50°

C.; Heat from −50° C. to 150° C. at 20° C./minute; Cool from 150° C. to 20° C. at 20° C./minute.

The Tg data are collected from the second heating run and quoted as the midpoint of the glass transition.

Mw/Mn by GPC

Apparatus: Agilent 1260 Infinity isocratic pump with refractive index detector. Isocratic run using HPLC grade THF as mobile phase. Pump flow rate 0.3 ml/min. Column type: Polymer Lab PLgel 5 μm, 250×4.6 mm Minimix-C. Columns are held at 40° C. during the process and the refractive index detector is held at 35° C.

Measurement protocol: Each unknown species is injected twice. Each pair of unknowns (i.e., 4 injections) is preceded by three injections of polystyrene standard mixtures. Eleven low polydispersity polystyrenes in these solutions span a molecular weight range from $6.04 \times 10^6$ down to 580. Plotting elution time on the horizontal axis and log Mw on the vertical axis, these give a nearly straight line. In practice, a third order fitted polynomial is usually drawn through the points to obtain a calibration. In the trace from any unknown polystyrene sample, one can then assign to every data point the molecular weight that a macromolecule eluting in that "time slice" has. Assuming the mass in each slice is proportional to the detector response, the sample's molecular weight averages "with respect to polystyrene" can be calculated. This is a standard procedure widely used for basic characterisation of acrylics, polyesters, and many other classes of polymer. For the purpose of this patent molecular weight information in the form of 'number average molecular weight' (Mn) and 'weight average molecular weight' (Mw) are reported, as is standard and a well-known method to those knowledgeable in the art of polymer science.

Acid Value

The acid value (AV) can be determined using a titration method. This titration involves titrating an acid functional polymer against a standardised solution of methanolic potassium hydroxide. The method described in ASTM D1639 'Standard Test Method for Acid Value of Organic Coating Materials' or an equivalent procedure as are well known to those skilled in the art, can be used to determine this value. If required the method could be modified slightly, for example through the use of a solvent that better solubilises the material to be analysed. For the purpose this patent, the solvent blend of choice for the solubilisation of acid functional resins was found to be a 3:1 mixture (by volume) of xylene and 1-methoxypropanol.

Epoxy Equivalent Weight

The epoxy equivalent weight (EEW) can be determined using a titration method. This titration involves titrating an epoxy functional material against a standardised solution of perchloric acid in the presence of tetraethylammonium bromide. The method described in ASTM D1652-11 'Standard Test Method for Epoxy Content of Epoxy Resins' or an equivalent procedure as are well known to those skilled in the art, can be used to determine this value. If required the method could be modified slightly, for example through the use of a solvent that better solubilises the material to be analysed. For the purpose this patent, the solvent blend of choice for the solubilisation of epoxy functional resins was found to be a 1:1 mixture (by volume) of xylene and butanone.

Example 1

An epoxy-functional polyester was prepared as follows:
a) A round bottomed flask was charged with 455 g of an acid functional, solid polyester;
b) The reaction vessel was fitted with a Dean-Stark apparatus and 83.1 g of potassium carbonate was added;
c) Propylene glycol monomethylether acetate (2250 mL) was added to the reactor as solvent;
d) The mixture was heated to reflux for 6-8 hours;
e) Epichlorohydrin (590 mL) was charged to the reactor and the reaction mixture is refluxed for a further 6-8 hours;
f) Excess epichlorohydrin was then removed by distillation;
g) The resulting hot slurry was passed through a filter;
h) The filtrate was allowed to cool to room temperature (23° C.);
i) The filtrate contained solid particles and was filtered through a filter bed;
j) The solid material remaining on the filter was collected and washed with methanol twice and dried for a couple of hours at elevated temperature to obtain a solid material that is an epoxy-functional polyester.

Example 2 (Comparative)

Example 1 was repeated, with the proviso that after step g), the reaction mixture was distilled to dryness to give the epoxy-functional polyester as an amorphous melt. The melt is cooled and solid epoxy-functional polyester is obtained.

Example 3

Example 1 was repeated, with the proviso that after step f):
The reaction vessel was cooled to room temperature with slow stirring;
Water was then added to the reaction mixture to dissolve the inorganic material;
The mixture contained solid product particles and was filtered through a filter bed;
The solid material remaining on the filter was collected and washed with water twice, methanol twice and dried for a couple of hours at elevated temperature to obtain a solid material that is an epoxy-functional polyester.

Example 4

An epoxy-functional polyester was prepared as follows:
a) A reaction vessel was charged with 3.5 kg of an acid functional, solid polyester;
b) The reaction vessel was charged with epichlorohydrin (4.48 L) and tetra methyl ammonium chloride (6.61 g) and fitted with an overhead stirrer and temperature probe;
c) While stirring, the reaction was heated to 100° C.;
d) A vacuum was then applied such that the reaction mixture could be refluxed at 70° C.;
e) A 50% w/w solution of potassium hydroxide (158.6 g) in water (158.6 g) was then added over a 1 hr period with continuous azeotropic removal of the water;
f) After the addition, the reaction mixture was allowed to heat for a further 1 hour until the water had ceased to be azeotroped;

g) The epichlorohydrin and other volatiles were then distilled out of the jacketed vessel;
h) Propylene glycol monomethyl ether acetate was added (15 L) and the reaction mixture heated to 120° C.;
i) The obtained hot slurry was filtered through a bed of celite;
j) The filtrate was allowed to cool to room temperature (23° C.);
k) The filtrate contained solid particles and was filtered through a filter bed;
l) The solid material remaining on the filter was collected and washed with methanol twice and dried for a couple of hours at elevated temperature to obtain a solid material that is an epoxy-functional polyester.

The results of Examples 1-4 are summarized in Table 1 below.

TABLE 1

Results of Examples 1-4

| | | Example | | | |
|---|---|---|---|---|---|
| Property | | 1 | 2 | 3 | 4 |
| Acid functional polyester | Tg (° C.) | 68 | 68 | 68 | 68 |
| | AV (mg KOH/g) | 35-37 | 35-37 | 35-37 | 35-37 |
| | $M_n$ | 3,587 | 3,587 | 3,587 | 3,587 |
| | $M_w$ | 11,759 | 11,759 | 11,759 | 11,759 |
| Epoxy-functional polyester | Tg (° C.) | 59 | 27 | 56 | 57 |
| | $M_n$ | 4,723 | 3,530 | 4,940 | 5,000 |
| | Conversion level (%) | >90 | >90 | >90 | >90 |

The results of Table 1 demonstrate that the isolation method described in this invention is critical to obtain an epoxy-functional polyester with a high Tg (suitable for use in powder coatings), even when the epoxidation process is the same (Comparison of Examples 1 and 2). The results of Table 1 also show that the isolation method described in this invention, allows the isolation of very similar material (suitable for use in powder coatings), regardless of the epoxidation methodology used (Comparison of Examples 1 and 4).

The invention claimed is:

1. A process for the manufacture of an epoxy-functional polyester, comprising the steps of:
   a) providing a polyester having functional groups selected from hydroxyl groups and carboxylic acid groups;
   b) reacting the functional groups of the polyester with an epihaloalkane in the presence of an aprotic solvent to obtain an epoxy-functional polyester dissolved in a liquid phase;
   c) precipitating the epoxy-functional polyester from the liquid phase obtained in step b); and
   d) isolating the precipitated epoxy-functional polyester from the liquid phase by a solid-liquid separation technique selected from filtration, centrifuge separation and decantation to obtain a solid epoxy-functional polyester.

2. A process according to claim 1, wherein the polyester having functional groups has carboxylic acid groups.

3. A process according to claim 1, wherein an excess of epihaloalkane is used in step b), and wherein at least a part of the excess of epihaloalkane is removed prior to step c).

4. A process according to claim 1, wherein the reaction in step b) is conducted in the presence of an ammonium- or phosphonium-salt catalyst.

5. A process according to claim 4, wherein a halide side product formed during reaction b) is removed prior to precipitation step c).

6. A process according to claim 1, wherein the reaction in step b) is conducted in the presence of a base.

7. A process according to claim 6, wherein the base is selected from the group consisting of inorganic salts, metal hydroxides and alkoxides.

8. A process according to claim 6, wherein a halide side product formed during reaction b) is removed prior to precipitation step c).

9. A process according to claim 1, wherein the epoxy-functional polyester is precipitated by cooling to a temperature below 30° C.

10. A process according to claim 1, wherein the liquid phase provided in step b) is subjected to filtration prior to step c).

11. A process according to claim 1, further comprising mixing the solid epoxy-functional polyester obtained with other components to form a coating composition.

12. A process according to claim 11, wherein the coating composition is a powder coating composition.

13. A process according to claim 1, wherein the aprotic solvent is selected from the group consisting of propyleneglycol monomethyl ether acetate, xylene, toluene, benzene, ethyl acetate, n-butyl acetate, n-propylacetate, isopropyl acetate, isoamyl acetate, tetrahydrafuran, 2-methyltetrahydrofuran, diethylether, tert-butylmethylether, anisole, acetone, methylethylketone, methylisopropylketone, methyl-n-butylketone, methyl-iso-butylketone, methylisoamylketone, cyclohexanone, dimethylformamide, N-ethylacetamide, N-methylacetamide, dimethylsulfoxide, dichloromethane, chloroform, 1,2-dichloroethane, dimethylcarbonate, diethylcarbonate and mixtures thereof.

14. A process according to claim 1, wherein the aprotic solvent is propyleneglycol monomethyl ether acetate, xylene, or a mixture thereof.

* * * * *